US006927703B2

(12) United States Patent
Watson

(10) Patent No.: US 6,927,703 B2
(45) Date of Patent: Aug. 9, 2005

(54) TRAFFIC AWARENESS SYSTEMS AND METHODS FOR DISPLAYING AIRCRAFT TRAFFIC WITH GROUND-TRACK HEADING

(75) Inventor: Jerry L. Watson, Mission, KS (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/300,113

(22) Filed: Nov. 20, 2002

(65) Prior Publication Data

US 2004/0095259 A1 May 20, 2004

(51) Int. Cl.[7] .................................................. G01C 21/00

(52) U.S. Cl. ........................................................ 340/979

(58) Field of Search ................................ 340/979, 980, 340/952, 955; 343/35, 38

(56) References Cited

U.S. PATENT DOCUMENTS

| | | | | | |
|---|---|---|---|---|---|
| 5,313,201 | A | * | 5/1994 | Ryan | 340/961 |
| 6,683,541 | B2 | * | 1/2004 | Staggs et al. | 340/961 |
| 2002/0053983 | A1 | * | 5/2002 | Chamas et al. | 340/945 |

* cited by examiner

*Primary Examiner*—Jeffery Hofsass
*Assistant Examiner*—Jennifer Stone

(57) ABSTRACT

A traffic awareness system displays ground-track heading information on a traffic information screen for other aircraft within the proximity range of the host aircraft. Symbols identify other aircraft locations by position on the traffic information screen and show ground-track heading by display and orientation of a ground-track heading indicator.

18 Claims, 4 Drawing Sheets

TRAFFIC AWARENESS SYSTEMS AND METHODS FOR DISPLAYING AIRCRAFT TRAFFIC WITH GROUND-TRACK HEADING

FIELD OF THE INVENTION

The present invention relates to the field of Avionics, and, in particular, to display of traffic information with ground-track heading symbology.

BACKGROUND OF THE INVENTION

As known to those skilled in the art, a pilot uses a multi-functional display ("MFD") to show the positions of other aircraft relative to his own position on an aircraft display. Traffic indicators on the display represent the other aircraft. The MFD typically derives its information from a Traffic Information System ("TIS"), known in the art. The pilot uses the MFD to build awareness of the other aircraft in his vicinity. Typically, the pilot studies the traffic information screen for several seconds to determine a ground-track heading for the other aircraft by observing movement of the traffic indicators. Such observation is not time effective. Alternatively, the pilot switches to a different display to observe the ground-track heading information shown numerically. Such maneuver and observation are neither time effective nor intuitive.

SUMMARY OF THE INVENTION

Systems and methods herein provide for the display of ground-track heading on a traffic information screen, for use in a host aircraft or cockpit. One method displays other aircraft ("traffic") as symbols with ground-track heading indicators on the traffic information screen. The method includes the steps of receiving data from a TIS unit, generating the symbols with ground-track heading indicators, and displaying the symbols on the traffic information screen. The method facilitates pilot assimilation and awareness of the traffic as compared to switching between displays and/or determining ground-track heading from traffic indicator movement, as in the prior art.

In one aspect, a method indicates ground-track heading for aircraft traffic, including the steps of: electronically collecting traffic information data from a traffic information system; and processing the traffic information data to generate one or more symbols with ground-track heading indicators on a traffic information screen, the ground-track heading indicators showing ground-track heading of the aircraft traffic.

The step of processing may include displaying the ground-track heading indicators with a ground track heading indicator offset region, to visually highlight the ground-track heading indicators. For example, the ground-track heading indicator offset region may be displayed in a background color of the traffic information screen. At the same time, the body of the symbols may be displayed as a color different from the background color. In one example, the traffic information screen is shown with a black, white or green background color. In another example, the body of one or more symbols is shown in a yellow or white color. In another example, the body of the symbols has the background color, but also has a contrasting outline (e.g., a black outline).

Those skilled in the art should appreciate that these symbols may be shown on other avionics screens, such as a weather radar screen, navigation screen, and terrain screen.

In one aspect, a pilot switches between these various screens with a user input device.

In yet another aspect, a traffic awareness system is provided for a host aircraft. A display processor processes traffic information data (e.g., from a TIS unit) to identify position and ground track heading of aircraft traffic. A graphic display generator generates a traffic information screen on a monitor with one or more symbols of the aircraft traffic. Each of the symbols has a ground-track heading indicator graphically showing ground track heading for its associated aircraft traffic.

DETAILED DESCRIPTION OF THE PREFERRED EMBODIMENTS

Figure 1:
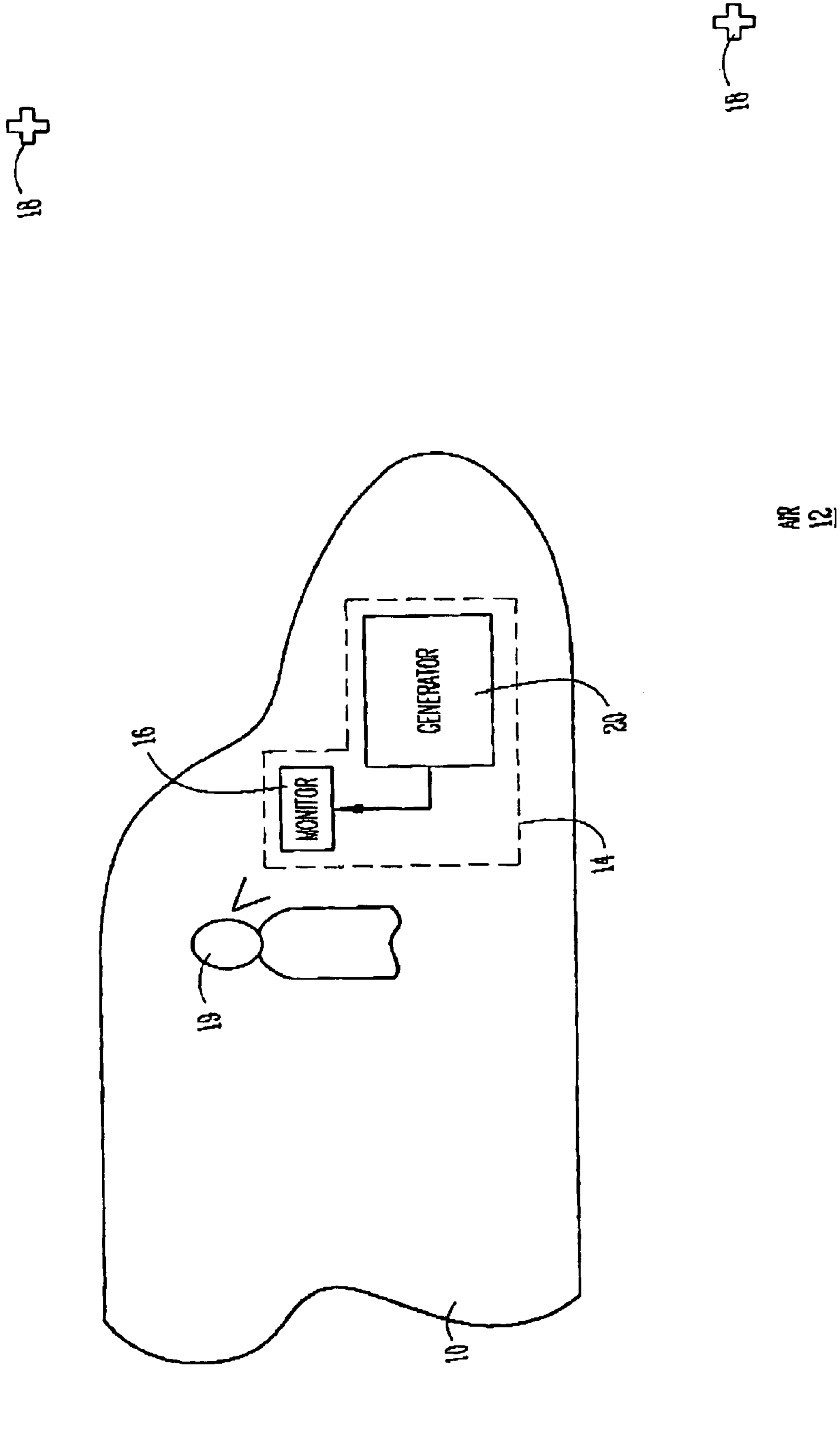
FIG. 1 illustrates one traffic awareness system in use aboard a host aircraft.

FIG. 1 shows a host aircraft 10 flying in air 12. A traffic awareness system 14 generates a traffic information screen on a monitor 16 to provide awareness of other aircraft 18 in the host aircraft's vicinity. Traffic awareness system 14 has a generator 20 that displays aircraft 18 as symbols on monitor 16 when aircraft 18 are within a proximity threshold. As described below, these symbols have ground-track heading indicators to provide a pilot 19 with improved awareness of aircraft 18, to better avoid near or actual collision.

Figure 2:
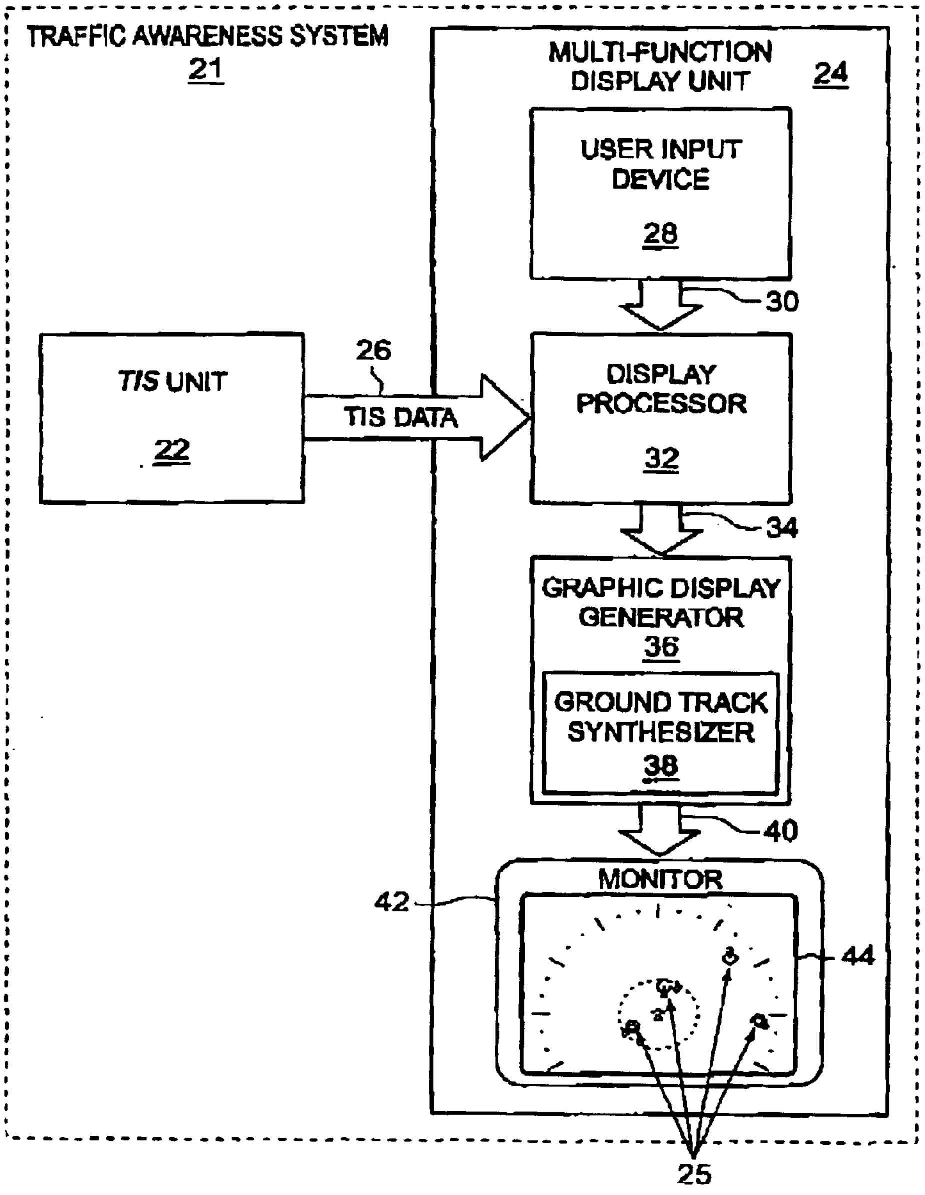
FIG. 2 is a block diagram illustrating one traffic awareness system for displaying traffic information with ground-track heading.

FIG. 2 shows one traffic awareness system 21 constructed in accord with one embodiment. Traffic awareness system 21 is typically used within an aircraft (e.g., host aircraft 10, FIG. 1) to show a traffic information screen 44 on a monitor 42. A Traffic Information System ("TIS") unit 22 supplies TIS data to a display processor 32 in a multi-function display unit 24 via one or more data communication paths 26. Those skilled in the art should appreciate that units 22 and 24 may include one or more additional aircraft electronic devices or instruments that provide navigation, traffic, and/or air data information, and may be connected together by one or more data buses.

Multi-function display unit 24 graphically depicts other aircraft (e.g., aircraft 18, FIG. 1) as symbols 25, described in more detail below. These symbols 25 include ground-track heading indicators and may be used with other display screens (not shown), such as a navigation screen, a terrain screen, and a weather radar screen, in addition to traffic information screen 44. Multi-function display unit 24 may further include a user input device 28 that allows the pilot to select different display screens and/or optionally a display scale.

User input device 28 communicates with a display processor 32 via data bus 30. Display processor 32 selects relevant information from TIS data of bus 26 and sends that data to a graphic display generator 36, via data bus 34. Graphic display generator 36 constructs traffic information screen 44 using a ground track synthesizer 38 to generate symbols 25 with ground-track heading indicators. Traffic information screen 44 is displayed on monitor 42 under control of generator 36 using data bus 40.

Figure 3:
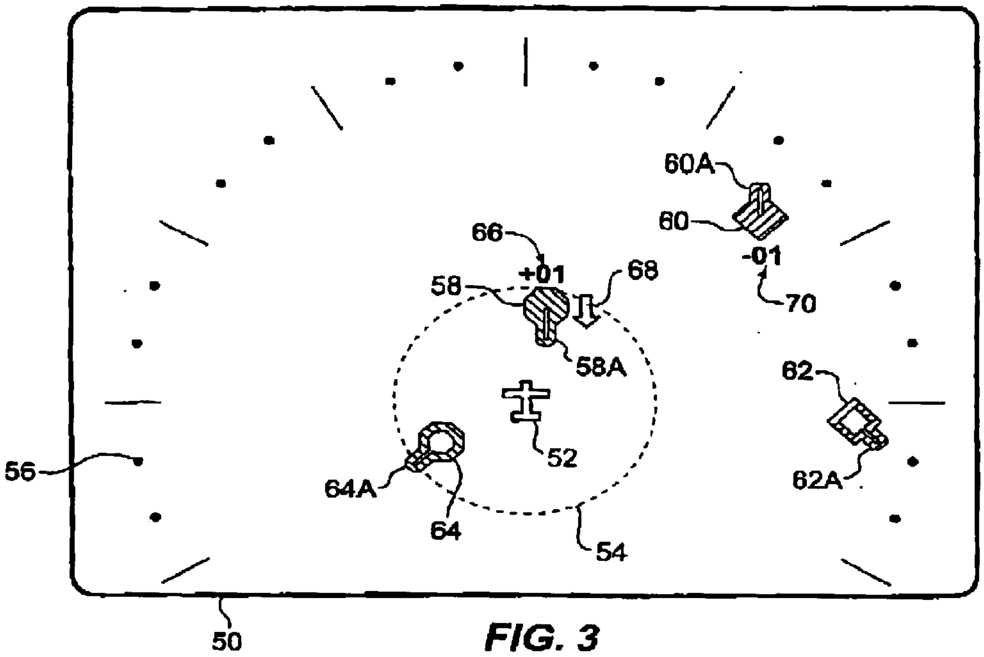
FIG. 3 illustrates one traffic information screen displaying symbols with ground-track heading indicators.

FIG. 3 depicts one traffic information screen 50 showing a host aircraft symbol 52 indicating position and orientation of the host aircraft (e.g., aircraft 10, FIG. 1), a range circle 54 indicating display scale, a compass rose 56 indicating bearings to host aircraft symbol 52, and four symbols, 58, 60, 62 and 64, with ground-track heading indicators, 58A, 60A, 62A and 64A, respectively. Additional information may be shown adjacent to symbols 58, 60, 62 and 64, such as TIS information 66, 68, and 70. By way of example, symbol 58 is adjacent to a relative altitude number 66 and an altitude change indicator 68, and symbol 60 is adjacent to a relative altitude number 70. In the case of symbol 60, since no altitude change indicator is shown adjacent to symbol 60, the aircraft traffic associated with symbol 60 has constant relative altitude.

In one example, symbol 58 represents a first aircraft that is considered a collision threat. Relative altitude number 66 and altitude change indicator 68 in particular show that the first aircraft is above the host aircraft and descending relative to the host aircraft. Via indicator 58A, symbol 58 also shows a ground-track heading of 180 degrees relative to the host aircraft.

In another example, symbol 60 represents a second aircraft that is not considered a collision threat. Relative altitude number 70 indicates that the second aircraft is maintaining a lower altitude relative to the host aircraft. Via indicator 60A, symbol 60 also shows that the second aircraft is heading in the same direction as the host aircraft.

In another example, symbol 62 represents a third aircraft that is not reporting altitude, and is not considered a collision threat. Via indicator 62A, symbol 62 shows that the third aircraft is heading in a direction 135 degrees relative to the host aircraft.

In another example, symbol 64 represents a fourth aircraft that is not reporting altitude but is considered a collision threat. Via indicator 64A, symbol 64 shows that the fourth aircraft is heading in a direction 225 degrees relative to the host aircraft.

As can be appreciated by those skilled in the art, a pilot may quickly view symbol 58 to learn that the first aircraft is a serious threat. At the same time, the pilot may discern that the fourth aircraft is not a threat, by reviewing symbol 64; specifically, although the fourth aircraft is close to the host aircraft, symbol 64 shows, through ground-track heading indicator 64A, that the fourth aircraft is moving away from the host aircraft and is not a serious threat.

Figure 4:
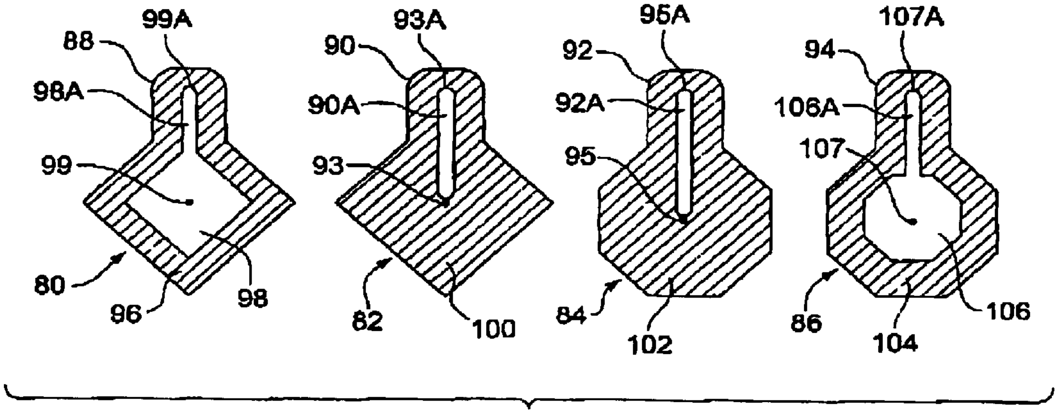
FIG. 4 illustrates four symbols with ground-track heading indicators as used in FIG. 2 and FIG. 3.

FIG. 4 depicts four symbols 80, 82, 84 and 86 with ground-track heading indicators 88, 90, 92 and 94, respectively. Ground-track heading indicators 88, 90, 92 and 94 show the direction and heading of other aircraft relative to the host aircraft. Ground-track heading indicators 88, 90, 92 and 94 may for example indicate headings between 0 and 360 degrees. In FIG. 4, each ground-track heading indicator 88, 90, 92 and 94 is shown in the 0 degree position.

In one example, symbol 80 may be used to represent a first aircraft within the proximity threshold that is not reporting altitude, but is not considered a collision threat. A crosshatch region 96 represents a body of symbol 80 and may be displayed as a solid color in white on a traffic information screen with a colored or darker background, for example. A region 98 may be black or a color that matches the screen background color, when displayed on the traffic information screen. Region 98 may further extend into ground track heading indictor offset region 98A, to highlight ground-track heading indicator 88. In one embodiment, region 98A extends from a center 99 of symbol 80 to an endpoint 99A of indicator 88 and along the direction of ground track heading.

In another example, symbol 82 may be used to represent a second aircraft within the proximity threshold that is reporting altitude information, but is not considered a collision threat. A crosshatch region 100 represents a body of symbol 82 and may be displayed as a solid color in white on a traffic information screen with a colored or darker background, for example. A ground track heading indicator offset region 90A of indicator 90 may be black or a color that matches screen background color, when displayed on a traffic information screen, to highlight ground-track heading indicator 90. In one embodiment, region 90A extends from a center 93 of symbol 82 to an endpoint 93A of indicator 90 and along the direction of ground track heading.

In another example, symbol 84 may be used to represent a third aircraft within the proximity threshold that is reporting altitude, and is considered a collision threat. Crosshatch region 102 represents a body of symbol 84 and may be displayed as a solid color in yellow on a traffic information screen with a colored or darker background, for example. A ground track heading indictor offset region 92A of the ground-track heading indicator 92 may be black or a color that matches screen background color, when displayed on a traffic information screen, to highlight ground-track heading indicator 92. In one embodiment, region 92A extends from a center 95 of symbol 84 to an endpoint 95A of indicator 92 and along the direction of ground track heading.

In another example, symbol 86 may be used to represent a fourth aircraft within the proximity threshold that is non-altitude reporting, but is considered a collision threat. Crosshatch region 104 represents a body of symbol 86 and may be displayed as a solid color in yellow on a traffic information screen with a colored or darker background, for example. Center region 106 may be black or a color that matches screen background color, when displayed on a traffic information screen. Region 106 may further extend into ground track heading indictor offset region 106A, to highlight ground-track heading indicator 94. In one embodiment, region 106A extends from a center 107 of symbol 86 to an endpoint 107A of indicator 94 and along the direction of ground track heading.

The crosshatch regions 96, 100, 102, 104 of symbols 80, 82, 84, 86, respectively, may also be colored the same as the background color of the traffic information screen. In such an embodiment, the body of these crosshatch regions is outlined by a contrasting color, such as a black outline of regions 96, 100, 102, 104.

Figure 5:
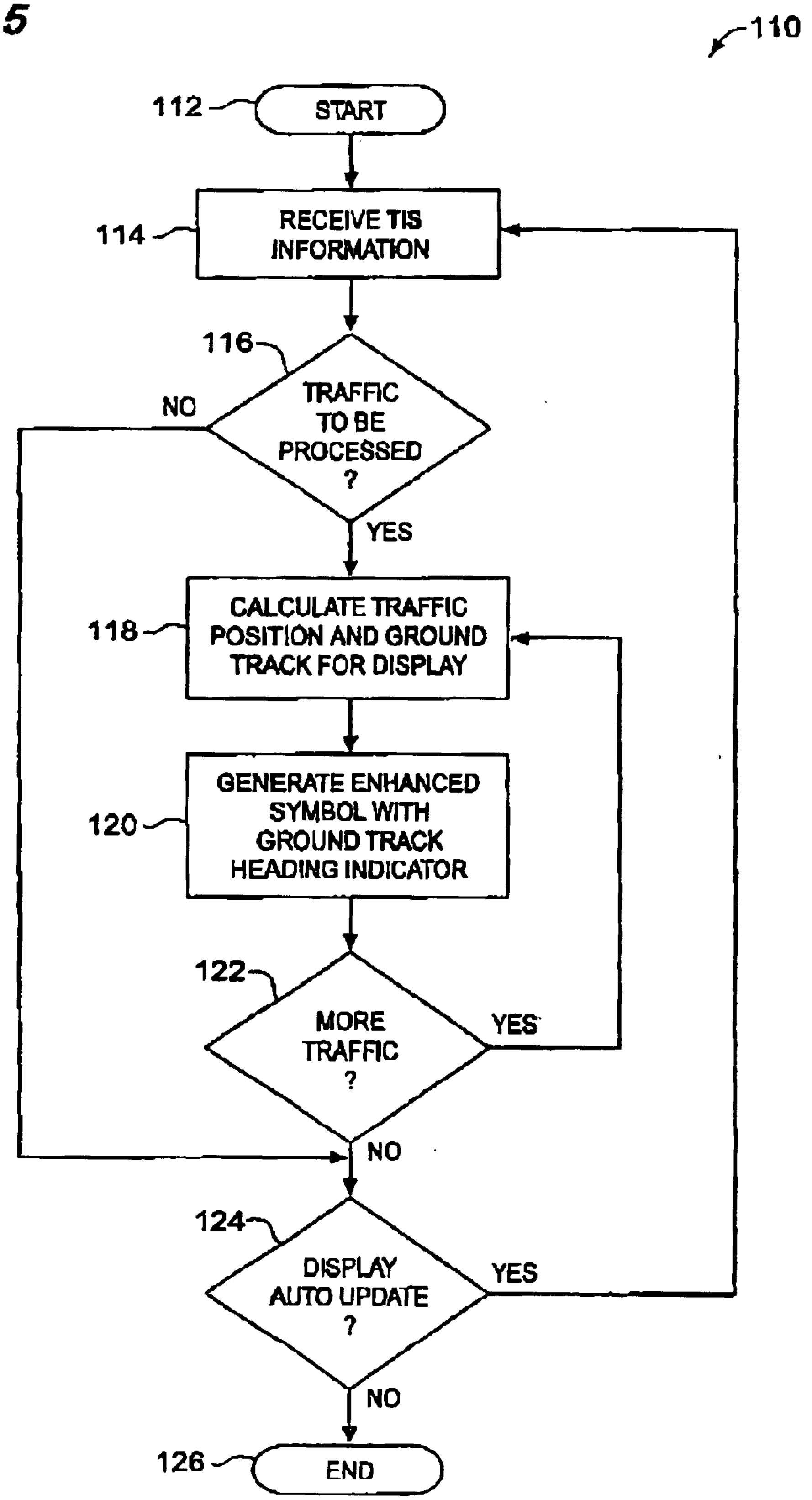
FIG. 5 shows a flow chart illustrating one process for generating symbols with ground-track heading indicators.

FIG. 5 shows a flow chart illustrating one process 110 for generating symbols with ground-track heading indicators. Process 110 starts at step 112 where it is assumed that the pilot has already selected the traffic information screen on the multi-function display unit. The sequence continues with step 114.

At step 114, TIS information is received from the TIS unit. Process 110 continues with step 116.

Step 116 is a decision. TIS information received at step 114 may contain information for several aircraft within the host aircraft proximity range. Step 118 through step 122 constitutes a loop to process the information for each aircraft sequentially. If the TIS information received at step 114 contains information for one or more aircraft that can be displayed on the traffic information screen, process 110 continues with step 118; otherwise process 110 continues with step 124.

Step 118 calculates the screen location and orientation associated with one symbol with ground-track heading.

Step 120 generates the symbol with ground-track heading indicator for the traffic information screen.

Step 122 is a decision. If additional symbols are to be generated, process 110 continues with step 118; otherwise process 110 continues with step 124.

Step 124 is a decision. The TIS unit may continually update traffic aircraft information. The multi-function display unit may thus update the traffic information screen automatically until a different screen is selected, or until the system is shut down. If the traffic information screen is to be updated continually, process 110 continues with step 114; otherwise process 110 terminates at step 126.

It should be appreciated by those skilled in the art that the angles represented by the illustrated ground track indicators (e.g., 58A, 60A, 62A and 64A, FIG. 3) are not limiting, but should be oriented to the correct angle for the aircraft they represent.

Those skilled in the art will appreciate that variations from the specified embodiments disclosed above are contemplated herein. The description should not be restricted to the above embodiments, but should be measured by the following claims.

What is claimed is:

1. A method for indicating ground-track heading for aircraft traffic, comprising the steps of:

electronically collecting traffic information data from a traffic information system; and processing the traffic information data to generate one or more symbols with ground-track heading indictors on a traffic information screen, the ground-track heading indicators showing ground-track heading of the aircraft traffic, wherein the symbols have shapes representative of collision threat, and wherein the ground-track heading indicators have a ground track heading indicator offset region to visually highlight the ground-track heading indicators.

2. The method of claim 1, the step of processing comprising providing a relative altitude and altitude change indicator for at least one of the symbols.

3. The method of claim 2, the step of displaying comprising displaying the ground-track heading indicator offset region in a background color of the traffic information screen.

4. The method of claim 3, the step of displaying comprising displaying a body of the symbols as a color different from the background color.

5. The method of claim 4, the traffic information screen having one of a black or green background color.

6. The method of claim 5, the body having one of a yellow or white color.

7. The method of claim 3, the step of displaying comprising displaying a body of the symbols as the background color with a contrasting outline.

8. The method of claim 7, the contrast outline being black.

9. The method of claim 1, further comprising displaying the symbols on at least one of a weather radar screen, navigation screen, and terrain screen.

10. A traffic awareness system for a host aircraft, comprising:

a monitor;

a display processor for processing traffic information data to identify position and ground track heading of aircraft traffic;

a graphic display generator for generating a traffic information screen with one or more symbols of the aircraft traffic on the monitor, each of the symbols having a ground-track heading indicator graphically showing ground-track heading for its associated aircraft traffic and a shape representative of potential collision threat, and each of the symbols having a ground-track heading indicator offset region to visually highlight its associated ground-track heading indicator.

11. A system of claim 10, the graphic display generator comprising a ground-track synthesizer for generating the ground-track heading indicator.

12. A traffic awareness system for a host aircraft, comprising:

a monitor;

a display processor for processing traffic information data to identify position and ground track heading of aircraft traffic;

a graphic-display generator for generating a traffic information screen with one or more symbols of the aircraft traffic on the monitor, each of the symbols having a ground-track heading indicator graphically showing ground-track heading for its associated aircraft traffic and a representative of potential collision threat, a ground-track heading indicator offset region comprising a background color of the traffic information screen.

13. A system of claim 10, each of the symbols having a body comprising a color different from the background color.

14. A system of claim 10, the background color comprising one of black or green.

15. A system of claim 10, further comprising (a) at least a weather radar screen, navigation screen, and terrain screen, and (b) a user input device for alternatively selecting display of the traffic information screen, the weather radar screen, the navigation screen, and the terrain screen, on the monitor.

16. A system of claim 10, further comprising a TIS unit for generating the traffic information data.

17. A system of claim 10, each of the symbols having a body comprising the background color and contrasting outline.

18. A multi-functional display unit for displaying aircraft traffic with ground-track heading within a host aircraft, comprising:

a monitor;

a display processor for processing traffic information data from a TIS unit to identify position and ground-track heading of the aircraft traffic;

a graphic display generator for generating a traffic information screen with one or more symbols of the aircraft traffic on the monitor, each of the symbols having a ground-track heading indicator graphically showing ground-track heading for its associated aircraft traffic, and a portion representative of whether a corresponding aircraft is reporting altitude, each of the symbols having a ground-track heading indicator offset region to visually highlight its associated around-track heading indicator, the ground-track heading indicator offset region comprising a background color of the traffic information screen, each of the symbols having a body comprising either (a) a color different from the background color or (b) the background color with a contrasting outline.

* * * * *